United States Patent
Wei

(10) Patent No.: US 6,305,516 B1
(45) Date of Patent: Oct. 23, 2001

(54) RATCHET TOOL

(76) Inventor: Yong Lung Wei, 1 F, 1, Alley 16, Lane 40, Jinn Te Rd., Taichung (TW)

( * ) Notice: Subject to any disclaimer, the term of this patent is extended or adjusted under 35 U.S.C. 154(b) by 0 days.

(21) Appl. No.: 09/537,475

(22) Filed: Mar. 30, 2000

(51) Int. Cl.⁷ .............................. B25B 13/46; F16D 41/08
(52) U.S. Cl. ................................... 192/44; 81/59.1
(58) Field of Search .................... 192/38, 44; 81/59.1

(56) References Cited

U.S. PATENT DOCUMENTS

| | | | |
|---|---|---|---|
| Re. 34,680 | * 8/1994 | Lieser | 81/59.1 |
| 4,051,935 | * 10/1977 | Nakayama | 192/44 |
| 5,943,921 | * 8/1999 | Lin | 81/59.1 |

* cited by examiner

*Primary Examiner*—Richard M. Lorence

(57) ABSTRACT

A ratchet tool includes a handle with a tubular member extending therefrom in which a cylindrical member is received. A sleeve is rotatably mounted to the cylindrical member. The cylindrical member has three plain surface defined in a periphery thereof and the sleeve has an inner tube which is inserted between the cylindrical member and the tubular member. The cylindrical member has three plain surfaces and the inner tube has three recesses, each recess having a roller retained therein between the inner tube and the cylindrical member. When rotating the sleeve, the rollers contact the plain surfaces so as to let the tool be rotated in one way, and the sleeve is fixedly connected to the cylindrical member when the periphery of the cylindrical member contacts the rollers.

3 Claims, 4 Drawing Sheets

RATCHET TOOL

FIELD OF THE INVENTION

The present invention relates to a ratchet tool comprising a cylindrical member having three plain surfaces and a sleeve mounted to the cylindrical member, the sleeve having three rollers retained in three recesses thereof so that the rotational direction of the ratchet tool can be determined by rotating the sleeve.

BACKGROUND OF THE INVENTION

A conventional ratchet tool includes a ratchet mechanism which generally has a pawl member with teeth on two ends thereof and a toothed ring which is engaged with the pawl member. The pawl member has a lever connected thereto so that the user may shift the lever to let either end of the two toothed ends of the pawl member engage with the toothed ring so that the ratchet tool can output torque in a desired direction. The depth of the teeth of the ring and the pawl member is limited because deep depth of the teeth will make the pawl member and the ring to become too large to be a hand-operation tool. Furthermore, the lever connected to the pawl member is so small so that it is difficult to shift it especially the user's hand generally is adhered with lubricant or oil. Besides, the two ends of the pawl member has only limited teeth which cannot bear a large torque to be output when engaged with the toothed ring.

The present invention intends to provide a ratchet tool which has a cylindrical member received in a sleeve, the sleeve has three rollers retained therein and the cylindrical member has three plain surfaces so that when the rollers contact the surfaces, the tool can be rotated in one way, and when the periphery of the cylindrical member contacts the rollers, the sleeve and the cylindrical member are combined to be as a one-piece member.

SUMMARY OF THE INVENTION

In accordance with one aspect of the present invention, a ratchet tool is provided and comprises a handle having a tubular member extending therefrom into which a cylindrical member is inserted. Three plain surfaces are defined in a periphery of the cylindrical member and a sleeve is mounted to the cylindrical member. The sleeve has an inner tube which shares a common axis with the sleeve so that the tubular member is received between the sleeve and the inner tube. The inner tube is located between the tubular member and the cylindrical member. Three recesses are defined in a distal end of the inner tube and three rollers are respectively retained in the three recesses between the tubular member and the cylindrical member so that when rotating the sleeve, the rollers are respectively contact the three plain surfaces.

The main object of the present invention is to provide a ratchet tool which has a sleeve rotatably mounted to a cylindrical member which has three plain surfaces. Three rollers are retained in the sleeve and contact the plain surfaces so that when the peak connected between the plain surface and the periphery of the cylindrical member urges the roller, the cylindrical member is rotated with the sleeve to output an torque.

Further objects, advantages, and features of the present invention will become apparent from the following detailed description with appropriate reference to the accompanying drawings.

DETAILED DESCRIPTION OF THE PREFERRED EMBODIMENTS

Figure 1:
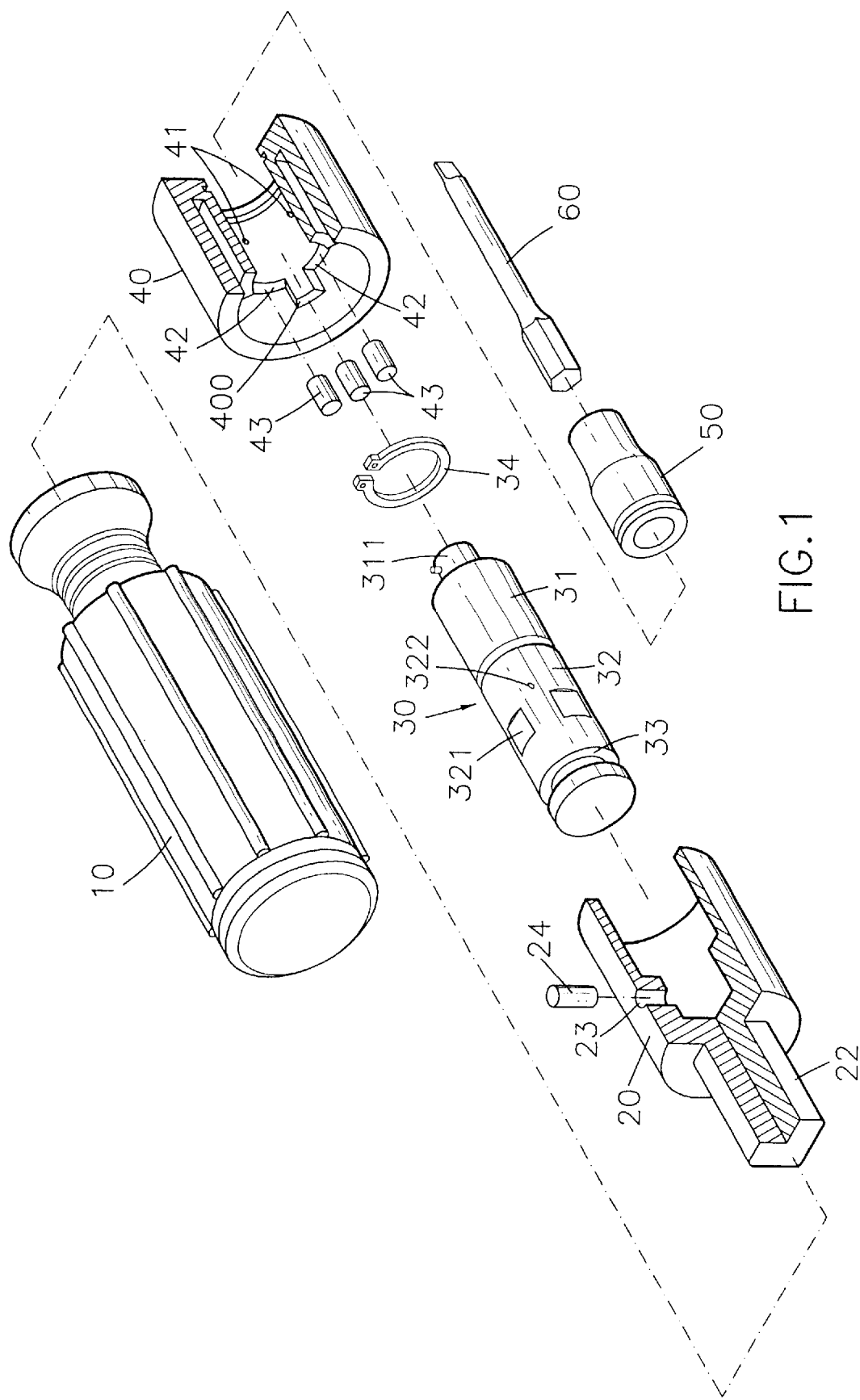
FIG. 1 is an exploded view of the ratchet tool in accordance with the present invention.
Figure 2:
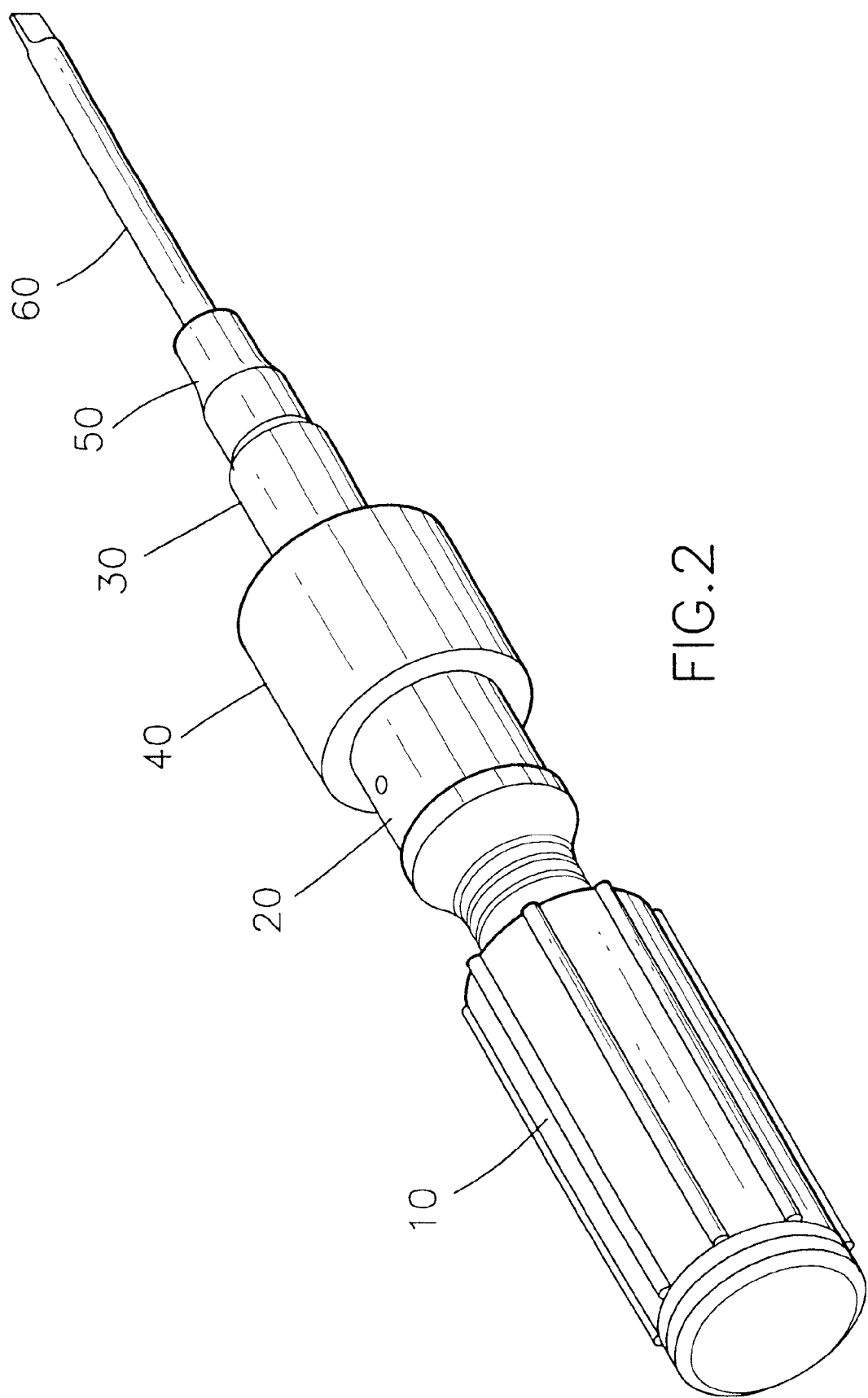
FIG. 2 is a perspective view of the ratchet tool in accordance with the present invention.
Figure 3:
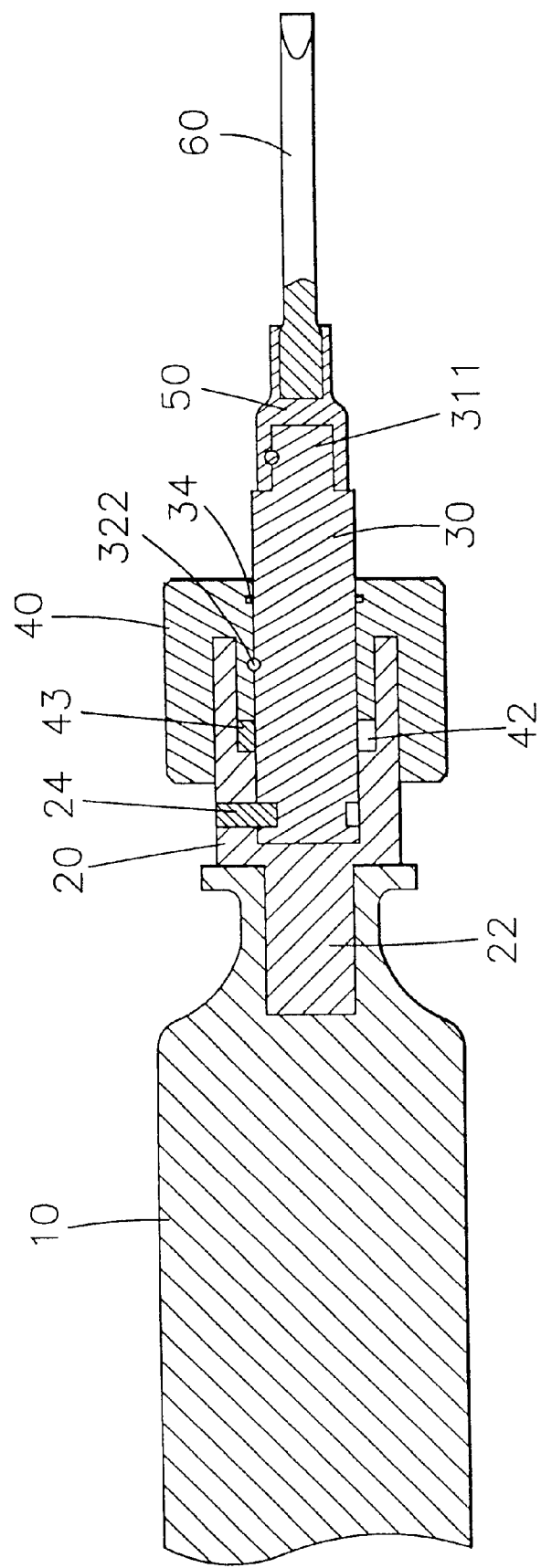
FIG. 3 is a side elevational view, partly in section, of the ratchet tool in accordance with the present invention.

Referring to FIGS. 1 to 4, the ratchet tool of the present invention comprises a handle 10 having an open end. A tubular member 20 has a rectangular insertion 22 extending from one of two ends of the tubular member 20 and the insertion 22 is fixedly received in the open end of the handle 10. The tubular member 20 has a hole 23 defined radially therethrough for a pin 24 received therein.

A cylindrical member 30 has a first end thereof inserted into the tubular member 20 and contacts against a bottom of the tubular member 20, a groove 33 is defined in the periphery of the cylindrical member 30 so that the pin 24 is engaged with the groove 33. Three plain surfaces 321 are defined in a periphery of the cylindrical member 30 and three balls 322 extend from the periphery of the cylindrical member 30. An engaging head 311 extends from a second end of the cylindrical member 30 so as to be connected to an adapter member 50 to which a bit 60 is engaged.

A sleeve 40 has an inner tube 400 which shares a common axis with the sleeve 40. The sleeve 40 is mounted to the tubular member 20 so that the tubular member 20 is received between the sleeve 40 and the inner tube 400, and the inner tube 400 is located between the tubular member 20 and the cylindrical member 30. Three recesses 42 are defined in a distal end of the inner tube 400 and three rollers 43 respectively retained in the three recesses 42 between the tubular member 20 and the cylindrical member 30. Three dents 41 are defined in an inside of the inner tube 400 so that the three balls 322 are received in the three dents 41 and the engagement of the balls 322 and the dents 41 provides an indexing feature for the user.

Figure 4:
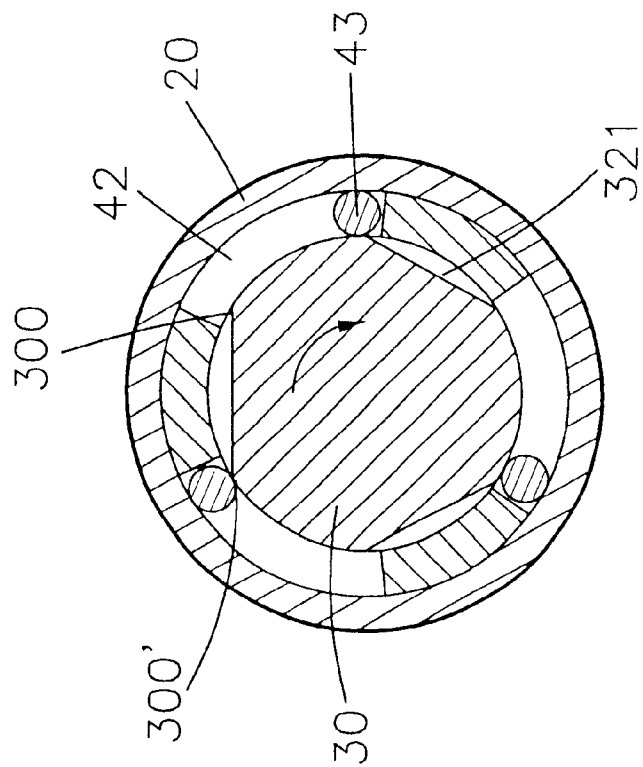
FIG. 4 is an illustrative view to illustrate the cylindrical member is freely rotated clockwise when the roller is not yet urged by either one of two peaks of the cylindrical member.
Figure 5:
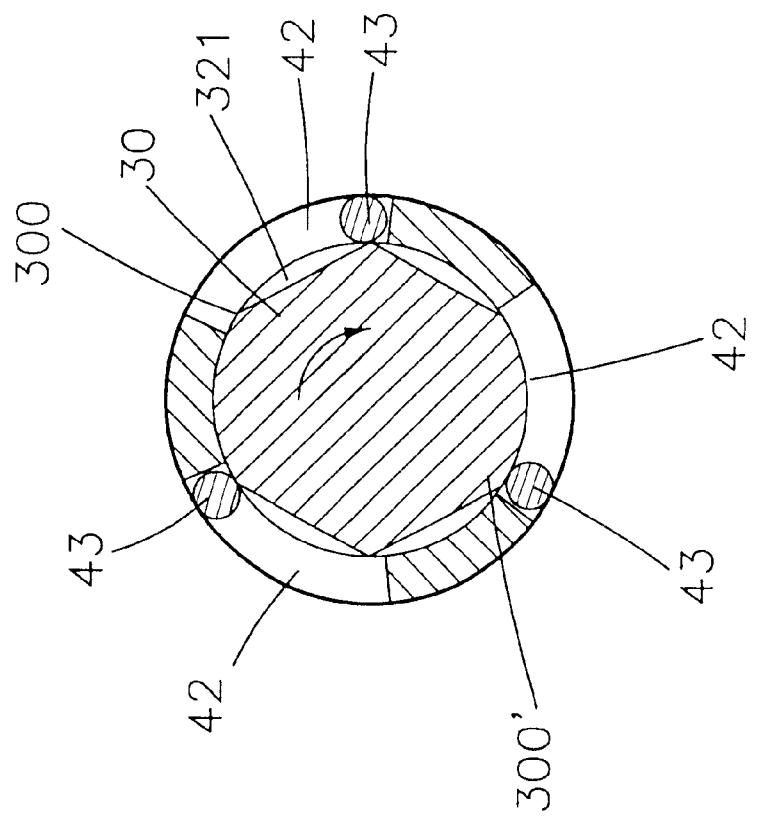
FIG. 5 is an illustrative view to illustrate the cylindrical member is rotated with the sleeve when the cylindrical member is rotated counter clockwise while the roller is urged by one of two peaks of the cylindrical member.

Accordingly, when each roller 43 is located at the position where the roller 43 contacts an inside of the recess 42 and one of the peaks 300, 300' connecting the plain surface 321 and the periphery of the cylinder member 30 as shown in FIG. 4, if the cylindrical member 30 is rotated clockwise, the plain surface 321 is rotated while the roller 43 will not move. As shown in FIG. 5, when the other peak 300' is moved to contact the roller 43, and the user keeps on rotating the cylindrical member 30 clockwise, the roller 43 is urged between the peak 300', the inside of the recess 42 and the tubular member 20 so that the sleeve 40 is rotated with the cylindrical member 30. If the user rotates the handle 10 counter clockwise, the plain surface 321 together with the recess 42 allow the roller 43 not to be urged and therefore, the cylindrical member 30 can be rotated independently from the sleeve 40.

The invention is not limited to the above embodiment but various modification thereof may be made. It will be understood by those skilled in the art that various changes in form and detail may made without departing from the scope and spirit of the present invention.

What is claimed is:

1. A ratchet tool comprising:

a handle with a tubular member extending therefrom, said tubular member having a hole defined radially therethrough;

a cylindrical member having a first end thereof inserted into said tubular member, three plain surfaces defined in a periphery of said cylindrical member, said cylindrical member having a groove defined in said periphery thereof, a pin inserted into said hole of said tubular member and engaged with said groove in said cylindrical member, and a sleeve having an inner tube which shares a common axis with said sleeve, said tubular member received between said sleeve and said inner tube, said inner tube located between said tubular member and said cylindrical member, three recesses defined in a distal end of said inner tube and three rollers respectively retained in said three recesses between said tubular member and said cylindrical member so that when rotating said sleeve, said rollers respectively contact said three plain surfaces.

2. The ratchet tool as claimed in claim 1 further comprising three dents defined in an inside of said inner tube and said cylindrical member having three balls extending radially outward therefrom so that said three balls are received in said three dents.

3. The ratchet tool as claimed in claim 1, wherein an engaging head extends from a second end of said cylindrical member.

* * * * *